S. R. SKOV & T. SCULLIN.
DOOR FOR PASSENGER CARS.
APPLICATION FILED JULY 25, 1908.

916,045.

Patented Mar. 23, 1909.
2 SHEETS—SHEET 1.

S. R. SKOV & T. SCULLIN.
DOOR FOR PASSENGER CARS.
APPLICATION FILED JULY 25, 1908.

916,045.

Patented Mar. 23, 1909.
2 SHEETS—SHEET 2.

ATTEST
E. M. Fisher.
J. C. Mussun.

INVENTORS.
Soren Robertson Skov.
Terance Scullin.
BY Fisher & Moser, ATTYS.

UNITED STATES PATENT OFFICE.

SOREN ROBERTSON SKOV AND TERANCE SCULLIN, OF CLEVELAND, OHIO.

DOOR FOR PASSENGER-CARS.

No. 916,045.  Specification of Letters Patent.  Patented March 23, 1909.

Application filed July 25, 1908. Serial No. 445,331.

*To all whom it may concern:*

Be it known that we, SOREN ROBERTSON SKOV and TERANCE SCULLIN, citizens of the United States, residing at Cleveland, in the county of Cuyahoga and State of Ohio, have invented certain new and useful Improvements in Doors for Passenger-Cars; and we do declare that the following is a full, clear, and exact description of the invention, which will enable others skilled in the art to which it appertains to make and use the same.

Our invention relates to improvements in doors for passenger cars and in means for operating the same, particularly of the pay-as-you-enter type, and the invention consists in a door adapted especially for the side and front of a motor car which is capable of being folded and opened and closed by mechanism initially under control of the motorman in the vestibule, all substantially as shown and described and particularly pointed out in the claims.

Figure 1:
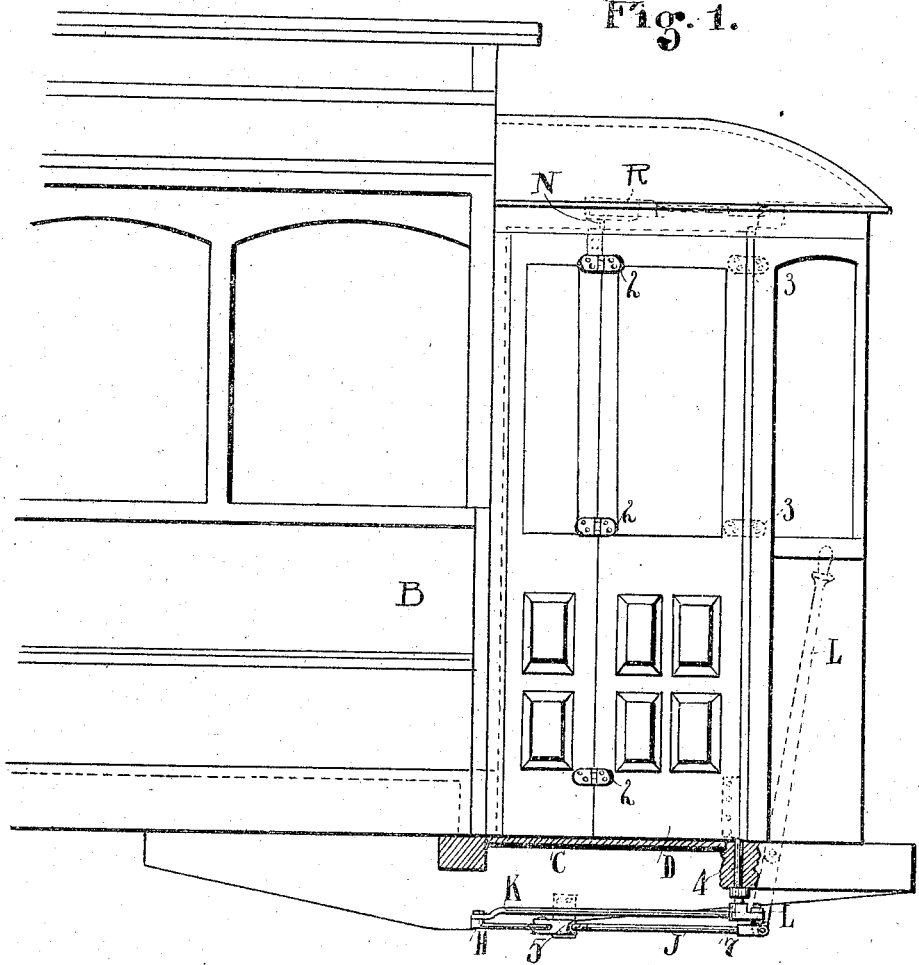
Figure 2:
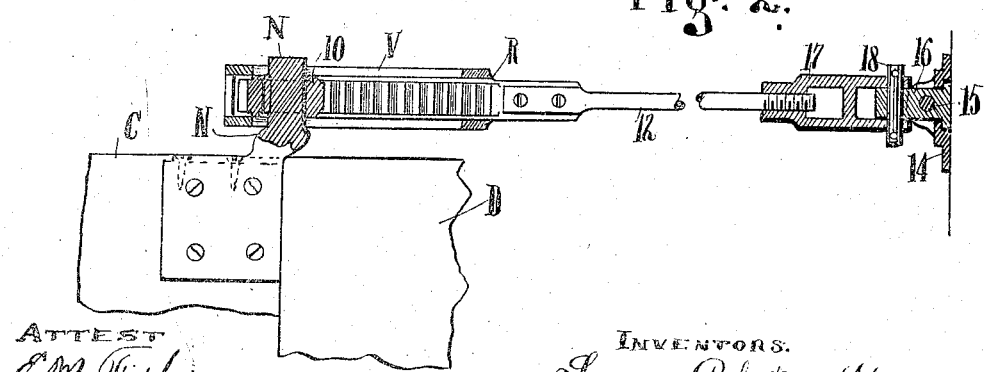
Figure 3:
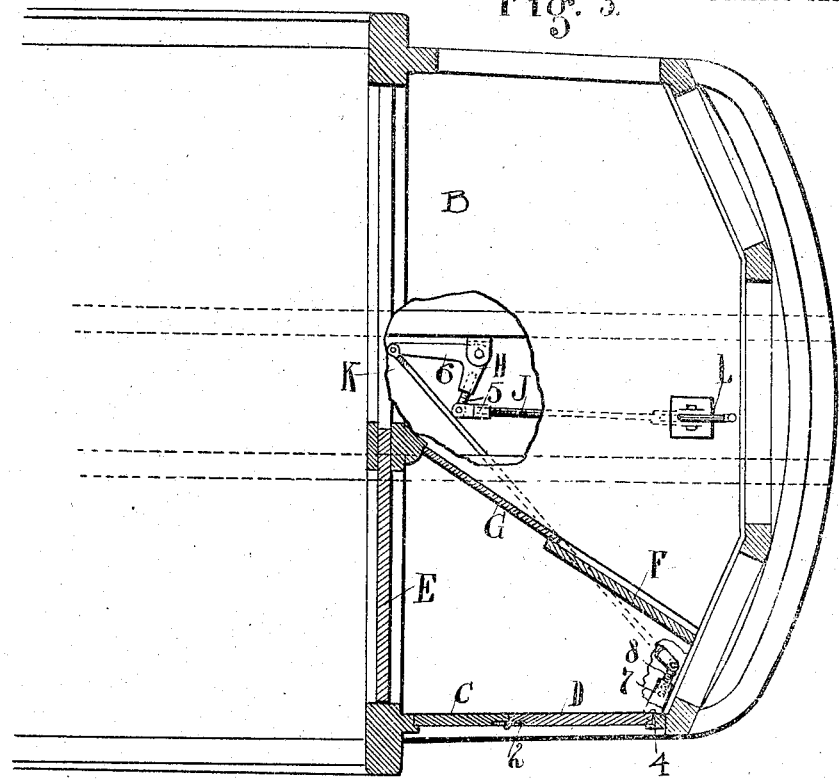
Figure 4:
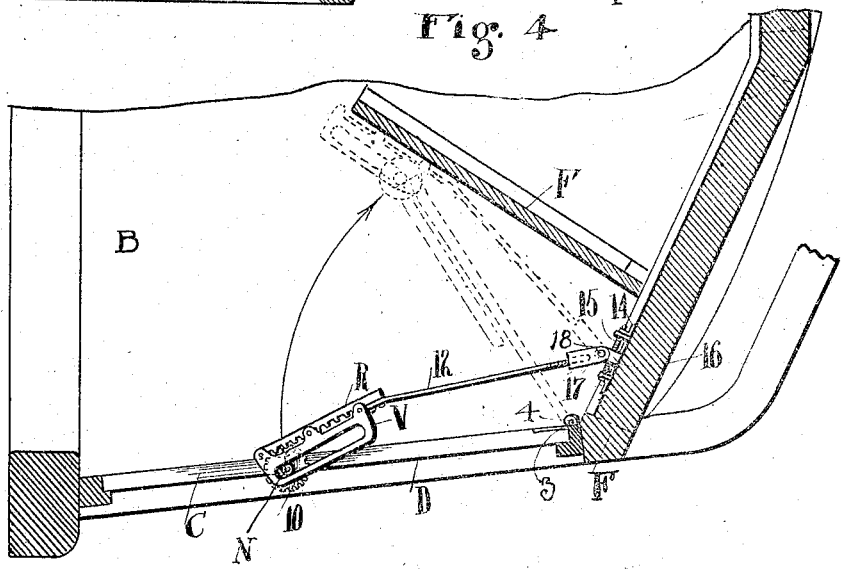

In the accompanying drawings, Figure 1 is a side elevation of the front portion of a car showing our new construction of door and the operating parts connected therewith. Fig. 2 is a side view, enlarged, of the mechanism connected with the upper portion of the door. Fig. 3 is a plan view of the front portion of a car with the vestibule, taken on a section line at or near the floor of the car and at one point showing the floor broken away and disclosing operating parts beneath. Fig. 4 is a sectional plan of the front part of the car shown in Fig. 3 and showing especially the means for controlling the front section of the door.

As thus shown the invention provides for entire control of the door by the motorman from his position in the vestibule of the car and through a hand controlled lever L within the convenient reach of the motorman. To these ends B represents the car body as a whole including the vestibule, and C and D represent the door, or the two sections thereof, front and rear. The front section C is narrower than rear section D to facilitate folding and getting the door speedily and completely out of the way of passengers, and suitable hinges 2 support the front section upon the front edge of the rear section and on which the front section is adapted to swing and fold back flat against the rear section, dotted lines Fig. 4. The said door is shown herein as located at one side of the vestibule outside the transverse sliding door E at the immediate front of the car proper, and is adapted to open inward on hinges 3 and 4 at its rear edge against the fixed partition F and to fold its front section on the rear section as it opens. Door G by which the motorman enters his own room slides behind said partition F, which stands diagonally across the vestibule to make room for passengers to depart or enter. Usually this way is closed against entrance and is used only for exit. The said door C and D is operated as a whole through lever L, which is pivoted at or in the floor of the vestibule and has positive mechanical connections with the door to open and close the same. These connections comprise the mechanism particularly shown in Figs. 1 and 2, and which consist of a bell crank lever H pivoted in its angle beneath the floor of the vestibule and connected with the lower short end of lever L by means of a link rod J and a short internally threaded joint 5 at its end through which adjustable connection between said rod and lever is made, providing thereby for the right working relations of the parts.

A link or rod K extends from the longer arm 6 of lever H to arm 7 rigid with the lower end of hinge or pivot projection 4 which is rigid with rear door D. Said projection or shaft extends down through one of the beams of the floor of the vestibule in this instance and has said arm 7 rigid with its lower exposed extremity and in such relation to the door as to become an operating arm or lever to turn the same on its hinges and which practically makes a right angled piece of the parts 4 and 7. A screw connection 8 is also provided in this case between rod K and arm 7 so as to exactly adjust the parts for operation when they are first put in place or afterward as may be required, and in this way a positive mechanical operating connection is established between the motorman's lever L and the door to turn the door as a whole on its hinges 3 and 4 and open and close the same.

Now, in order that front door section C shall coöperate with section D and itself be automatically folded and unfolded, we provide the mechanism seen in Figs. 2 and 4, in which said door or door section C is shown as having a stud or post N fixed rigidly to the top thereof, Figs. 1 and 2, in line with or above its hinges 2 and upon which a pinion 10 is splined or otherwise secured. This pinion or toothed member 10 is made the medium for turning the door section C on its hinges, and is itself operated upon by a relatively fixed rack R. That is, the said rack is rigid with a brace rod 12 which runs back to the frame of the vestibule for support and to which frame it is affixed by a bracket 14 directly upon said frame and in which there is a screw 15 carrying a nut 16. A yoke 17 is swiveled or pivoted in nut 16 on pivot pin 18 therein and carries the rod 12, which is threaded in said yoke for adjustment. Nut 16 is designed to be adjusted back and forth in respect to pivots 3 and 4 of section D by rotating the screw on which it is mounted and is slidable in a suitable guideway in bracket 14. By the adjustment of nut 16 on screw 15 we are enabled to fix and maintain the alinement of the two doors or door sections as well as obtain the folding of the outer section back against the inner section when the whole door is open, as shown in dotted lines, Fig. 4.

The rack R is carried by an oppositely slotted head V and the slots of which run on post N above and below or on opposite sides of pinion 10. This adapts the rack R to its operations with or upon pinion 10 and gives the rack all the run it requires as the door swings on its hinges 3 and 4 and the front section swings on its hinges 2 and whereby said section is folded and unfolded automatically. The entire arm comprising rack R and parts 12 and 17 swings with the door on pivot 18 throughout all its movements, and said parts are so adjusted that the two sections will be in straight alinement when the door is closed and folded upon each other when it is open. The foregoing construction provides positive means for opening and closing door C in respect to door D when the latter is operated by the motorman directly through lever L and the several adjustments described are intended to provide for the movements of both doors or sections in such measure and to such extent as they may require for harmonious action in all their joint operations and relations. Any suitable means other than a hand lever may be used to open and close the door through the medium of the balance of the mechanism herein described. Thus, fluid power may be utilized to advantage in some instances.

It is obvious that compressed air or other power agencies may be employed to operate the door mechanism hereinbefore described, and these may take the place of lever L or supplement the same.

What we claim is:—

1. A car having a two section side door and a lever and connections to operate the rear section comprising an arm rigid with the bottom and rear of the rear section, a bell crank lever fixed on the bottom of the car and a pivoted lever and link to actuate said bell crank lever, a link connecting said bell-crank lever with said arm on the door, and separate connections for the front part of the door engaged with the top thereof and adapted to automatically control the same.

2. A car and a door in the side thereof having front and rear sections hinged together and the rear section having a hinge projection fixed on its bottom and rear and a lever and links operatively connected with said projection to open and close the entire door, in combination with devices to automatically open and close the front section of the door, said devices comprising a pivot post on the top and rear of said section and a pinion fixed on said post, a slotted head slidably mounted on said post and a rack thereon engaging said pinion, said rack pivoted to swing with the door, and a pivotally fixed arm engaging one end of said head, whereby the outer section of the door is swung when the rear section is opened or closed.

3. In cars, a sectional folding door and means to open and close the same, in combination with means to automatically control the position of the outer section in respect to the inner section comprising a post on the top of said outer section and a pinion fixed on said post, a rack engaging said pinion and means supporting said rack on said post, a yoke with which said rack is rigidly connected, a screw supported on the wall of the car and a nut thereon having hinged connection with said yoke.

In testimony whereof we sign this specification in the presence of two witnesses.

SOREN ROBERTSON SKOV.
TERANCE SCULLIN.

Witnesses:
E. M. FISHER,
H. T. FISHER.